United States Patent
Kaneko et al.

(10) Patent No.: US 11,760,887 B2
(45) Date of Patent: Sep. 19, 2023

(54) TITANIUM MATERIAL

(71) Applicant: NIPPON STEEL CORPORATION, Tokyo (JP)

(72) Inventors: Michio Kaneko, Tokyo (JP); Kiyonori Tokuno, Tokyo (JP); Takao Wada, Tsubame (JP); Mitsuyuki Hasegawa, Tsubame (JP); Kazuo Yamagishi; Mitsuru Nakayama, Tsubame (JP)

(73) Assignee: NIPPON STEEL CORPORATION, Tokyo (JP)

( * ) Notice: Subject to any disclaimer, the term of this patent is extended or adjusted under 35 U.S.C. 154(b) by 540 days.

(21) Appl. No.: 17/053,051

(22) PCT Filed: Jun. 18, 2018

(86) PCT No.: PCT/JP2018/023120
§ 371 (c)(1),
(2) Date: Nov. 4, 2020

(87) PCT Pub. No.: WO2019/244206
PCT Pub. Date: Dec. 26, 2019

(65) Prior Publication Data
US 2021/0189144 A1     Jun. 24, 2021

(51) Int. Cl.
*C09C 3/06* (2006.01)
*C23C 28/02* (2006.01)

(52) U.S. Cl.
CPC .............. *C09C 3/063* (2013.01); *C23C 28/02* (2013.01); *C01P 2006/62* (2013.01); *C01P 2006/63* (2013.01); *C01P 2006/64* (2013.01); *C01P 2006/80* (2013.01)

(58) Field of Classification Search
None
See application file for complete search history.

(56) References Cited

U.S. PATENT DOCUMENTS

2003/0168133 A1   9/2003   Kaneko et al.

FOREIGN PATENT DOCUMENTS

| JP | H10-130886 A | 5/1998 | |
|---|---|---|---|
| JP | P2002-12962 A | 1/2002 | |
| WO | WO-2011007738 A1 * | 1/2011 | ............. B21D 13/00 |

OTHER PUBLICATIONS

Machine translation of WO2011007738A1 from EPO (https://worldwide.espacenet.com/patent/search/family/043449346/publication/WO2011007738A1?q=pn%3DWO2011007738A1), accessed and translated Jun. 15, 2023 (Year: 2011).*

* cited by examiner

*Primary Examiner* — Elizabeth Collister
(74) *Attorney, Agent, or Firm* — Myers Wolin, LLC

(57) ABSTRACT

The titanium material includes a titanium oxide layer formed on a surface of titanium being a base material, the titanium oxide layer having a thickness measured by a glow discharge spectrometry of 60 to 300 nm, wherein: the titanium oxide layer contains 0.5 to 7.0 at % of nitrogen, and an arithmetic mean roughness Ra of a surface thereof is 2.0 to 4.0 µm; and a power spectrum of a surface roughness of the titanium material has a peak of an amplitude height of 0.005 to 0.020 µm in a range of a wavelength of 1.1 to 2.5 µm and has a peak of an amplitude height of 0.0010 to 0.0030 µm in a range of a wavelength of 0.80 to 0.98 µm. An L*a*b* color space may be L*: 30 to 40, a*: 2.0 to 9.0, and b*: −7.0 to 18.0.

16 Claims, 2 Drawing Sheets

TITANIUM MATERIAL

TECHNICAL FIELD

The present disclosure relates to a titanium material.

BACKGROUND ART

Titanium is a material light in weight and excellent in corrosion resistance, and is used for various usages such as aircraft, chemical plant, exterior material of building, decorative article, and consumer product. In particular, for exterior material and decorative article, color-developing titanium exhibiting various color tones is sometimes required from the viewpoint of design. The color-developing titanium has been conventionally manufactured by anodizing or ion plating.

In the anodizing, color development is caused by utilizing the interferential action of a titanium oxide layer of a titanium base material, and the color-developing titanium exhibiting various color tones can be manufactured. Depending on the usage, for example, color-developing titanium having low lightness and chroma (sometimes referred to as color-developing titanium of low lightness and chroma) is required for the exterior material of building required to have a subdued appearance.

Conventionally, color-developing titanium exhibiting a unique appearance such as a bronze color, a chocolate brown color, a gray color, and its manufacturing method have been suggested (refer to, for example, Patent Document 1). In the method disclosed in Patent Document 1, the spark discharge is generated when performing anodizing in an electrolytic solution containing either or both of nitrate ions and nitrite ions to thereby form a titanium oxide layer having fine asperities formed on the surface thereof.

Incidentally, in the case where titanium or color-developing titanium is used in the atmospheric environment for a long period, they may discolor to deteriorate the design, and therefore titanium in which the carbon concentration near the outermost layer is limited to suppress the discoloration is suggested (refer to, for example, Patent Document 2). Patent Document 2 suggests a method of mechanically or chemically removing the outermost layer of titanium to decrease the carbon concentration, and a method of performing electrocleaning after cold rolling, and performing annealing in a vacuum or in an inert gas to suppress intrusion of carbon to the surface of titanium.

RELATED ART DOCUMENT

Patent Document

Patent Document 1: Japanese Laid-open Patent Publication No. H10-130886
Patent Document 2: Japanese Laid-open Patent Publication No. 2002-12962

SUMMARY

Problems to be Solved

In recent years, a titanium material (color-developing titanium) lower in lightness and chroma and exhibiting a subdued appearance is sometimes required. In consideration of such circumstances, an object of the present disclosure is to provide a titanium material having low lightness and chroma, specifically, an $L^*a^*b^*$ color space of $L^*$: 30 to 40, $a^*$: 2.0 to 9.0, and $b^*$: −7.0 to 18.0.

Means for Solving the Problems

As a result of earnest studies, the present inventors have found that a titanium material has relative low lightness and chroma, the titanium material being manufactured by performing blast processing with alumina or SiC on the surface of titanium, thereafter performing anodizing at a low voltage in an acid solution, and performing anodizing of generating spark discharge in an electrolytic solution containing either or both of nitrate ions and nitrite ions. The present inventors have further found that the effect capable of adjusting the lightness to be lower can be obtained by performing the anodizing at a low voltage in an acid solution to generate a thin titanium oxide layer in advance and thereafter performing the anodizing in nitrate ions.

The present disclosure has been made based on the above knowledge and its gist is as follows.

[1] A titanium material including a titanium oxide layer formed on a surface of titanium being a base material, the titanium oxide layer having a thickness measured by a glow discharge spectrometry of 60 to 300 nm, wherein:
  the titanium oxide layer contains 0.5 to 7.0 at % of nitrogen, and an arithmetic mean roughness Ra of a surface thereof is 2.0 to 4.0 µm; and
  a power spectrum of a surface roughness of the titanium material has a peak of an amplitude height of 0.005 to 0.020 µm in a range of a wavelength of 1.1 to 2.5 µm and has a peak of an amplitude height of 0.0010 to 0.0030 µm in a range of a wavelength of 0.80 to 0.98 µm.

[2] The titanium material according to [1], wherein:
  the titanium oxide layer has projections each existing in an island shape: and
  an area ratio of the projections is 10% or more and 50% or less in a plan view of the titanium oxide layer.

[3] The titanium material according to [1] or [2], wherein the titanium oxide layer includes a titanium oxide film formed on the base material, and projections each formed in an island shape on a surface of the titanium oxide film.

[4] The titanium material according to any one of [1] to [3], wherein an $L^*a^*b^*$ color space is $L^*$: 30 to 40, $a^*$: 2.0 to 9.0, and $b^*$: −7.0 to 18.0.

[5] The titanium material according to any one of [1] to [3], wherein an average carbon concentration in a range within 500 nm from the surface of the titanium oxide layer is to 14% or less in at %.

Effect

According to the present disclosure, it is possible to provide a titanium material having lower lightness and chroma than before, specifically, an $L^*a^*b^*$ color space of $L^*$: 30 to 40, $a^*$: 2.0 to 9.0, and $b^*$: −7.0 to 18.0 and a manufacturing method thereof. Accordingly, the present disclosure can provide a titanium material suitable especially for an exterior material of a building built in Japanese style required to have a subdued appearance, for example, temples and shrines among titanium materials required to have a wide variety of color tones, and therefore remarkably contributes to the industry.

DETAILED DESCRIPTION

Hereinafter, the present disclosure will be explained in detail based on preferred embodiments of the present disclosure referring to the accompanying drawings. Note that in this specification and the drawings, the same codes are given to components having substantially the same functional configurations to omit duplicated explanation.

Further, for similar components in different embodiments, different alphabets are given to the end of the same code to distinguish them. However, in the case where a plurality of components or the like having substantially the same functional configuration do not need to be particularly distinguished from one another, only the same code is given to the components. Further, for easy explanation, the drawings are enlarged or contracted as required, and therefore the drawings do not indicate the actual sizes and ratios of the components.

1. First Embodiment 1.1 Titanium Material

Figure 1:
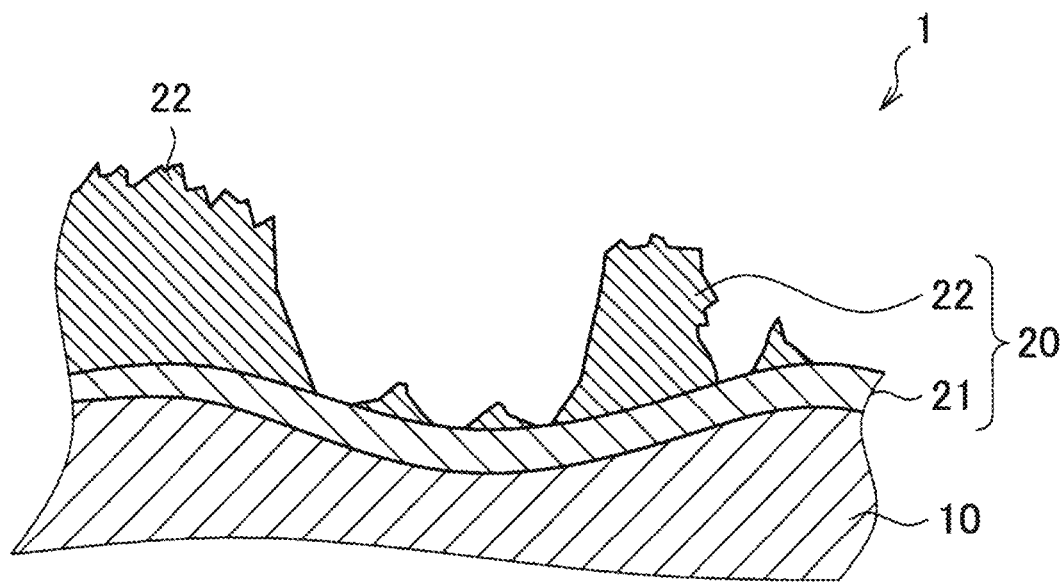
FIG. 1 is a schematic enlarged sectional view illustrating a layer configuration of a titanium material according to a first embodiment of the present disclosure.

First, a titanium material according to a first embodiment of the present disclosure will be explained referring FIG. 1. FIG. 1 is a schematic enlarged sectional view illustrating a layer configuration of the titanium material according to the first embodiment of the present disclosure.

A titanium material 1 according to the first embodiment is a titanium material having a titanium oxide layer 20 formed on the surface of titanium being a base material 10. In other words, the titanium material 1 has the base material 10 and the titanium oxide layer 20 formed on the surface of the base material 10. The thickness of the titanium oxide layer 20 measured by a glow discharge spectroscopy (GDS) which analyzes elements contained in the surface of the titanium material 1 is 60 to 300 nm, and the titanium oxide layer 20 contains, in at %, 0.5 to 7.0 at % of nitrogen.

Further, the surface roughness of the titanium material 1 is obtained, for example, by a surface roughness measuring device or the like, and an arithmetic mean roughness Ra of the titanium material 1 is 2.0 to 4.0 μm. Note that the arithmetic mean roughness Ra is one of surface property parameters defined by JIS B 0601: 2001. Furthermore, when a profile curve obtained by the surface roughness measuring device or the like is subjected to a power spectral analysis, the obtained profile has a peak of an amplitude height of 0.005 to 0.020 μm in a range of a wavelength of 1.1 to 2.5 μm and has a peak of an amplitude height of 0.0010 to 0.0030 μm in a range of a wavelength of 0.80 to 0.98 μm. Thus, the titanium material 1 according to this embodiment has a color tone expressed by L*: 30 to 40, a*: −2.0 to 9.0, b*: −7.0 to 18.0 in an L*a*b* color space, and exhibits an appearance of lower lightness and lower chroma than conventional titanium materials.

1.1.1 Base Material (Pure Titanium or Titanium Alloy)

For the base material 10 of the titanium material 1, pure titanium or titanium alloy can be used. Note that pure titanium and titanium alloy are collectively called "titanium". As such a base material 10, for example, industrial titanium may be used. Examples of the industrial titanium usable for the base material 10 include various types of industrial titanium described in JIS H 4600 and JIS H 4650. When workability is required, commercially pure titanium of JIS class 1 (for example, JIS H 4600) with reduced impurities is preferable. Besides, when strength is required, commercially pure titanium of JIS class 2 to class 4 is also applicable. Examples of the titanium alloy include JIS class 11 to class 23 in which a small amount of noble metal-based element (palladium, platinum, ruthenium or the like) is added to improve the corrosion resistance, JIS class 60 (for example, Ti-6Al-4V-based alloy) containing a relatively large amount of additive element, class 60E, class 61, class 61F, class 80 and so on.

However, in the case of containing a large amount aluminum as in the Ti-6Al-4V-based alloy, the corrosion resistance sometimes deteriorates to exert a bad influence on the resistance to discoloration. Therefore, when the titanium oxide layer 20 is formed on the surface of the titanium alloy as the base material 10, it is recommended to investigate the influence of the alloying elements with respect to the usage in advance and appropriately adjust the composition and the thickness of each layer according to the base material 10.

Alternatively, the base material 10 can be commercially pure titanium containing, for example: in mass %,
N: 0% or more and 0.050% or less;
C: 0% or more and 0.10% or less;
H: 0% or more and 0.015% or less;
O: 0% or more and 0.35% or less;
Fe: 0% or more and 0.50% or less; and
the balance composed of Ti and impurities.

Further, the base material 10 can be commercially pure titanium containing one or two or more selected from a group consisting of: in mass %, for example,
Al: 5.0% or more and 7.0% or less;
V: 3.0% or more and 5.0% or less;
Co: 0.10% or more and 1.0% or less;
Ni: 0.10% or more and 1.0% or less;
Pd: 0.010% or more and 0.30% or less; and
Ru: 0.010% or more and 0.30% or less, and containing:
N: 0% or more and 0.050% or less;
C: 0% or more and 0.10% or less;
H: 0% or more and 0.015% or less;
O: 0% or more and 0.35% or less;
Fe: 0% or more and 0.50% or less; and
the balance composed of Ti and impurities.

Here, the impurities are components which exist in titanium irrespective of the intention of addition and are originally not required to exist in the titanium material to be obtained. The term "impurities" is a concept including the impurities mixed from the raw material or manufacturing environment when industrially manufacturing titanium. Such impurities can be contained by an amount not exerting a bad influence on the effect of the disclosure of this application.

Further, as the impurities, a residue of blasting media caused from later-explained blast processing may be contained in the titanium material 1 to be manufactured using the base material 10. The impurities caused from the blast processing can exist near the surface of the titanium material 1. For example, less than 20 at % of Al in the case where the blasting media is alumina particles or less than 20 at % of Si or C in the case where the blasting media is SiC particles can exist near the surface of the titanium material 1 as the impurities.

Note that the base material 10 normally forms a plate, a line, a pipe, a wire rod, or a shape obtained by appropriately working one of them. However, the base material 10 may be in an arbitrary shape, for example, a spherical shape or a rectangular parallelepiped shape.

1.1.2. Titanium Oxide Layer

As explained above, on the surface of the base material 10, the titanium oxide layer 20 is formed. The titanium oxide layer 20 has an interferential action and greatly influences the color development of the titanium material 1. In particular, the titanium oxide layer 20 of the titanium material 1 according to this embodiment has the following configuration and thereby realizes the low lightness and chroma of the titanium material 1. The titanium oxide layer 20 in this embodiment is formed by anodizing on the surface provided with asperities of titanium of the base material 10, for example, by a surface conditioning step (blast processing with alumina or SiC).

(Configuration of the Titanium Oxide Layer)

As illustrated in FIG. 1, the titanium oxide layer 20 has a titanium oxide film 21 formed on the base material 10 and projections 22 each formed in an island shape on the surface of the titanium oxide film 21.

The titanium oxide film 21 is a coating film formed in a relatively uniform film thickness along the surface of the base material 10. In the case where the asperities are given to the surface of the base material 10 by the blast processing as explained above, the titanium oxide film 21 is formed along the asperities. On the other hand, the projections 22 are titanium oxide particles locally distributed on the titanium oxide film 21, namely, arranged in island shapes on the titanium oxide film 21. The projections 22 and the titanium oxide film 21, when manufactured by later-explained methods, are different in density of titanium oxide, and the titanium oxide film 21 is apt to be higher in density of titanium oxide.

As explained above, the titanium oxide layer 20 has the titanium oxide film 21 and the projections 22 in this embodiment, whereby an interface is generated between the titanium oxide film 21 and the projections 22, enabling more complicated irregular reflection. Owing to the interferential action of the titanium oxide layer 20 of the titanium material 1 having the above configuration, the appearance of the titanium material 1 exhibits lower lightness and chroma, thereby increasing the depth of the color shade in the appearance. In particular, owing to the difference in density of titanium oxide between the projections 22 and the titanium oxide film 21, the appearance of the titanium material 1 exhibits much lower lightness and chroma, thereby increasing the depth of the color shade in the appearance.

Besides, when viewing the titanium oxide layer 20 in a plan view from an outer surface side of the titanium material 1, the area ratio of the projections 22 is, but not particularly limited, for example, 10% or more, preferably 15% or more, and more preferably 20% or more. In contrast, when the area ratio of the projections 22 is less than 10%, it is impossible to obtain a subdued appearance depending on the thickness and the surface property of the titanium oxide layer 20. In the case of viewing the titanium oxide layer 20 in a plan view from an outer surface side of the titanium material 1, the area ratio of the projections 22 is, for example, 50% or less, preferably 35% or less, and more preferably 33% or less. If the area ratio of the projections 22 exceeds 50%, the titanium oxide layer 20 may have a considerably dark color tone depending on the thickness and the surface property of the titanium oxide layer 20.

Note that the area ratio of the projections 22 can be obtained by observing the surface on the side of the titanium material 1 where the titanium oxide layer 20 is formed, for example, by the energy dispersive X-ray spectroscopy and measuring the concentration of oxygen atoms. More specifically, a part where the projections 22 exist on the titanium oxide layer 20 is higher in oxygen concentration than a part where no projections 22 are formed.

Figure 3:
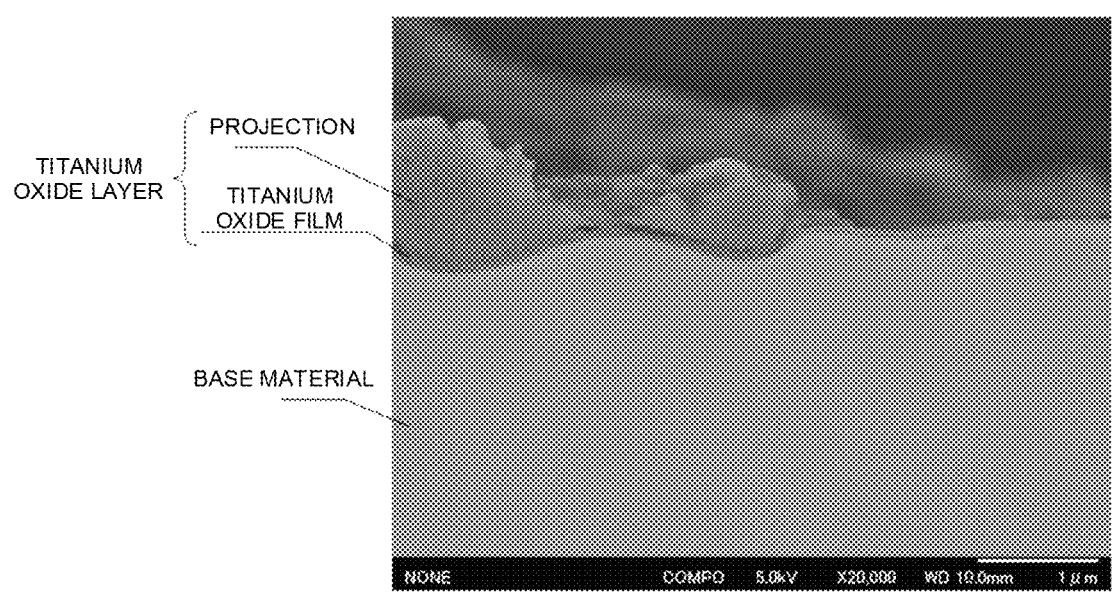
FIG. 3 is a scanning electron microscopic image illustrating a cross-section of a titanium material according to Example 2.

Further, on the titanium material 1 subjected to the blast processing through the later-explained surface conditioning step, the projections 22 are relatively non-uniformly formed in a small region. The area ratio is obtained, for example, by finding the area ratio of the projections 22 at observation places in the case of observing, regarding oxygen, five 50×50 μm square regions of the titanium material 1 by the energy dispersive X-ray spectroscopy. More specifically, the area ratio is found by dividing the area, in which oxygen is indicated by a luminescent spot for a measuring time of about 30 minutes at the observation places, by the whole area. For example, the area ratio of the projections in the titanium material according to later-explained Example 2 (Ex. 2) illustrated in FIG. 3 is 28%. This makes it possible to obtain a subdued appearance.

Note that in the titanium material 1 subjected to the blast processing, the projections 22 are non-uniformly formed in the aforementioned small region observed under the electron microscope or the like, but the whole titanium material 1 exhibits a uniform appearance without unevenness when visually checked.

(Thickness of the Titanium Oxide Layer)

The thickness of the titanium oxide layer 20 can be measured by the glow discharge spectrometry (GDS). In GDS, O (oxygen), N (nitrogen), C (carbon) and Ti are analyzed from the surface of the titanium material 1. The thickness of the titanium oxide layer 20 is obtained by the O concentration measured by GDS. Specifically, the distance in a depth direction from the uppermost surface down to a part where the O concentration is reduced by half with respect to the O concentration on the uppermost surface is regarded as the thickness of the titanium oxide layer 20. Note that the aforementioned thickness of the titanium oxide layer 20 means an average of thicknesses at measurement parts. Further, in the measurement of the O concentration by GDS, the measurement pitch can be set to 8 to 10 nm, and the measurement region can be set to have a diameter of 4 mm.

Further, the thickness of the titanium oxide layer 20 needs to be at least 60 nm or more for the appearance of low lightness and chroma. If the upper limit of the thickness of the titanium oxide layer 20 exceeds 300 nm, the titanium oxide layer 20 sometimes peels off due to working or the like, and therefore the upper limit is set to 300 nm. Further, the titanium oxide particles (projections 22) exceeding 300 nm may locally exist. The thickness of the titanium oxide layer 20 only needs to fall within the above range, and is preferably 70 nm or more and more preferably 80 nm or more. Thus, the appearance of the titanium material 1 exhibits sufficient low lightness and chroma. Further, the thickness of the titanium oxide layer 20 is preferably 270 nm or less, and more preferably 250 nm or less. This can surely prevent the peeling due to working.

(Surface Property of the Titanium Material)

The titanium material 1 according to this embodiment has the titanium oxide layer 20 formed by the anodizing on the surface of titanium of the base material given the asperities by the surface conditioning step (blast processing with alumina or SiC) as explained above. The asperities given to the base material 10 and taken over to the titanium oxide layer 20 can be evaluated by (i) the arithmetic mean roughness Ra. On the other hand, as will be explained later, by forming the titanium oxide layer 20 by a two-stage of anodizing (a titanium oxide film forming step and a titanium oxide layer forming step) after the surface conditioning step, the surface of the titanium material 1 has such a complicated shape that fine asperities having a short wavelength are formed in asperities having a long wavelength and a large height. To evaluate such a complicated surface property, (ii) the power spectral analysis of the surface roughness of the titanium material 1 is performed. The surface roughness of the titanium material 1 may be measured by the surface roughness measuring device and evaluated according to JIS B 0633: 2001. The power spectral analysis may be performed using general-purpose software.

(i) Arithmetic Mean Roughness Ra

By setting the arithmetic mean roughness Ra of the surface of the titanium oxide layer 20 to 2.0 μm or more, the appearance can be made to have low lightness and chroma. On the other hand, if the arithmetic mean roughness Ra of the surface of the titanium oxide layer 20 exceeds 4.0 μm, the appearance of the titanium material 1 becomes too low in lightness, and therefore the upper limit of the arithmetic mean roughness Ra is 4.0 μm. The arithmetic mean roughness Ra of the surface of the titanium oxide layer 20 only needs to fall within the above range, and if it is preferably 2.1 μm or more and more preferably 2.2 μm or more, the appearance of the titanium material 1 can be more surely made to have low lightness and chroma. On the other hand, if the arithmetic mean roughness Ra of the surface of the titanium oxide layer 20 is preferably 3.7 μm or less and more preferably 3.5 μm or less, the appearance of the titanium material 1 can be made to have appropriately lightness.

(ii) Power Spectrum of the Surface Roughness

In the present disclosure, the complicated surface property is evaluated by the profile of the power spectrum of the surface roughness of the titanium material 1. Specifically, the power spectral analysis of the profile curve obtained by the surface roughness measuring device is performed, the moving average processing of the power spectral is executed, and the surface property is evaluated by the range of the wavelength where the peak of the obtained profile exists by and the amplitude height of the peak. The profile of the power spectrum of the surface roughness of the titanium material 1 having low lightness and low chroma has a peak in a range of a wavelength of 1.1 to 2.5 μm and an amplitude height of the peak of 0.005 to 0.020 μm, and has a peak in a range of a wavelength of 0.80 to 0.98 μm and an amplitude height of the peak of 0.0010 to 0.0030 μm. The reason why the profile of the power spectrum of the surface roughness of the titanium material 1 has the peaks in the range of the wavelength of 1.1 to 2.5 μm and the range of the wavelength of 0.80 to 0.98 μm is not necessarily clear, but is possibly because particulate titanium oxides (projections 22) are generated by performing the anodizing at a predetermined voltage or higher after the blast processing as will be explained later.

(Concentration of Nitrogen Contained in the Titanium Oxide Layer)

The titanium oxide layer 20 formed on the surface of the titanium material 1 contains nitrogen due to the anodizing at a later-explained titanium oxide layer forming step. More specifically, as a result of performing the anodizing in an aqueous solution containing either or both of nitrate ions and nitrite ions so as to generate a spark discharge on the surface of titanium being the base material, the titanium oxide layer 20 contains nitrogen. If the content of nitrogen in the titanium oxide layer 20 is less than 0.5 at %, the formation of fine asperities is insufficient to fail to obtain the appearance having low lightness, and therefore the content is set to 0.5% or more. The content of nitrogen in the titanium oxide layer 20 is preferably set to 1.0 at % or more. On the other hand, if the content of nitrogen in the titanium oxide layer 20 exceeds 7.0 at %, the thickness of the titanium oxide layer 20 increases and sometimes peels off due to working or the like, and therefore the content is set to 7.0 at % or less. The content of nitrogen in the titanium oxide layer 20 is preferably set to 6.0 at % or less.

(Average Carbon Concentration in a Range Within 500 nm From the Surface of the Titanium Oxide Layer)

When the titanium material 1 having the titanium oxide layer 20 on the surface thereof is used outdoors for a long period, the titanium oxide layer 20 grows and sometimes changes in color tone due to the influence of the thickness. The change in color tone of the titanium material 1 is considered to be promoted by the carbon atoms existing near the surface of the base material 10. In order to enhance the resistance to discoloration of the titanium material 1, it is preferable to set the average carbon concentration in a range within 500 nm from the surface of the titanium oxide layer to 14% or less in at %. The average carbon concentration is preferably 10% or less in at %.

A lower limit of the average carbon concentration in the range within 500 nm from the surface of the titanium oxide layer 20 is more preferable, but the lower limit is not defined and may be 0.5% or more in at %. The average carbon concentration in the range within 500 nm from the surface of the titanium oxide layer 20 can be measured by GDS. Besides, the titanium oxide layer 20 sometimes contains nitrogen atoms, caused from the nitrate ions and the nitrite ions used for the anodizing, at a predetermined concentration, but the nitrogen atoms do not exert a bad influence on the appearance and the resistance to discoloration of the titanium material 1.

1.1.3 Appearance of the Titanium Material (L*a*b* Color Space)

In the present disclosure, color measuring of the titanium material 1 is performed according to JIS K 5600-4-5 and the color tone is quantitatively defined within the numerical range of the L*a*b* color space according to JIS K 5600-4-4. When L* is 30 to 40, a* is 2.0 to 9.0, and b* is −7.0 to 18.0 in the L*a*b* color space, it can be said that the appearance low in lightness and chroma is exhibited.

If L* exceeds 40, the color tone becomes bright, and therefore the upper limit of L* is set to 40. Further, if the lower limit of L* is lower than 30, the color tone becomes too dark, and therefore the lower limit of L* is set to 30. To obtain a color tone having appropriate brightness, L* is preferably 31 or more and 32 or more. Further, L* is preferably 39 or less and 38 or less.

Besides, if a* exceeds 9.0, the reddish color tone becomes high, and if a* is less than 2.0, the color tone becomes close to black, thereby no longer exhibiting the appearance having low lightness and chroma. To obtain the appearance having appropriate low lightness and chroma, a* is preferably 3.0 or more and 4.0 or more. Further, a* is preferably 8.0 or less and 7.0 or less.

Besides, if b* exceeds 18.0, the yellowish color tone becomes high, and if b* is less than −7.0, the blueish color tone becomes high, thereby no longer exhibiting the appearance having low lightness and chroma. To obtain the appearance having appropriate low lightness and chroma, b* is preferably −6.0 or more and −5.0 or more. Further, b* is preferably 17.0 or less and 16.0 or less.

1.2 Manufacturing Method of the Titanium Material

Next, an example of the manufacturing method of the above-explained titanium material 1 will be explained.

The manufacturing method of the titanium material according to this embodiment includes: a surface conditioning step of performing blast processing with alumina or SiC on the surface of the base material 10 made of titanium; a titanium oxide film forming step of thereafter performing anodizing on the surface of the base material 10 at a voltage of 10 V or lower in an acid solution; and a titanium oxide layer forming step of thereafter performing anodizing on the surface of the base material 10 at a voltage of higher than 10 V in an acid solution containing either or both of nitrate ions and nitrite ions.

1.2.1 Manufacturing Method of the Base Material (Titanium)

First, the manufacturing method of titanium as the base material 10 will be explained prior to the explanation of the above steps. Pure titanium or titanium alloy used for an exterior material is generally in a thin plate shape, and is rolled into a predetermined thickness by cold rolling, and then subjected to annealing. In the case of annealing in an atmosphere, it is only necessary to remove oxide scales by acid pickling. When annealing is performed in a vacuum, the step of removing scales formed during annealing can be omitted.

In the case where the resistance to discoloration is required, it is preferable to perform vacuum annealing in order to decrease the carbon concentration on the surface. Further, since a lubricating oil used for the cold rolling causes an increase in carbon concentration on the surface, it is preferable to remove the oil by alkaline degreasing before performing the vacuum annealing. On the other hand, in the case of performing annealing in the atmosphere, it is preferable to perform the acid pickling of removing the oxide scales, under the condition of increasing the amount of dissolution on the surface of the base material 10.

The annealing temperature can be appropriately adjusted according to the required mechanical characteristics of the base material 10, and is preferably 600° C. or higher. The upper limit of the annealing temperature is not particularly set, but the increase in the heat treatment temperature requires the increase in input heat quantity, and therefore the annealing temperature is preferably lower than 1200° C. from an economic viewpoint. The atmospheric annealing may be performed under the normal condition. In the case of performing the vacuum annealing in order to decrease the carbon concentration, the carbon on the surface needs to be diffused, and therefore the temperature is preferably 650° C. or higher and the treatment time is preferably 12 hours or more. In the case of performing the vacuum annealing a plurality of times, the total holding time at 650° C. or higher is preferably 12 hours or more. The upper limit of the holding time is not particularly limited, but is preferably 48 hours or less from the viewpoint of productivity.

1.2.2 Surface Conditioning Step

The surface conditioning step is a step of performing the blast processing with alumina or SiC on the surface of titanium as the base material 10. By performing the blast processing on the surface of the base material 10, asperities are formed on the surface of the base material 10 to reduce the lightness of the titanium material 1 to be obtained. Further, in the anodizing at the later-explained titanium oxide layer forming step, titanium oxides are generated preferentially at protrusion portions of the asperities of the base material 10. Therefore, unevenness of the appearance is unlikely to occur in the titanium material 1 to be obtained.

In contrast to the above, in the case of not performing the blast processing, the low lightness and chroma cannot be obtained. Further, in the anodizing at the later-explained titanium oxide layer forming step, the local formation of the titanium oxide particles (projections 22) in a small region becomes difficult, resulting in a uniform and even titanium oxide coating. As a result of this, the titanium material to be obtained does not have low lightness or chroma.

To reduce the lightness and chroma of the titanium material 1, the blasting media to be made to collide with the surface of titanium is preferably alumina or SIC. SiC is preferably a grid of angled non-spherical particles. The blasting pressure and the blasting angle of the blast processing with alumina or SiC are not limited in particular, but may be adjusted as needed. The size of each of the abrasive grain of alumina or SIC is preferably #600 to #30, and more preferably #120 to #240. The blasting pressure is preferably in a range of 0.1 to 0.6 MPa, and the blasting angle is preferably in a range of 45 to 90° (vertical) to the plate surface. The blasting angle may be changed by swinging a blasting nozzle with respect to the plate surface. An impeller may be used for the blast processing. Note the position of the means (an air-nozzle type or an impeller type) which blasts the abrasive grains may be fixed with respect to a conveyance direction, and a cutting board for the base material may be moved or a coil may be unwound or wound to move, thereby moving the surface to be projected in the conveyance direction by an automatic device. The surface to be projected of the base material may be fixed, and the abrasive grain blasting nozzle or the like may be moved in the conveyance direction.

1.2.3 Anodizing

After the surface conditioning step (for example, the blast processing with alumina or SiC), the anodizing at two-stage of the titanium oxide film forming step at a voltage of 10 V or lower and the titanium oxide layer forming step at a voltage of higher than 10 V is performed on the surface of titanium as the base material 10. The anodizing may be performed by electrically connecting the base material 10 and the counter electrode (for example, stainless steel) in an aqueous solution by DC power supply and by applying the voltage using the base material 10 as a positive pole. By performing the two-stage of anodizing in the order of the titanium oxide film forming step and the titanium oxide layer forming step, a titanium material having lower lightness and chroma than before can be manufactured. Its reason is not necessarily clear but can be presumed that when a thin titanium oxide film 21 is formed by the anodizing with a decreased voltage and then subjected to the anodizing with an increased voltage, particulate titanium oxides (projections 22) are locally generated by the spark discharge, and fine asperities having a short wavelength are formed and thereby can adjust the lightness to be lower.

Note that the voltage of the anodizing herein is assumed to have a value based on the load voltage. According to the examination by the present inventors, it was possible to manufacture the titanium material 1 having the aforementioned arithmetic mean surface roughness and the aforementioned peaks in the power spectrum by performing the two-stage of anodizing at the load voltage in the aforementioned range under the examined conditions.

(i) Titanium Oxide Film Forming Step

The titanium oxide film forming step is a step of performing the anodizing at a voltage of 10 V or lower in an acid solution on the surface of the base material 10 after the blast processing with alumina or SiC. In the titanium oxide film forming step, by setting the voltage to 10 V or lower, a thin titanium oxide film 21 can be formed on the surface of the base material 10 prior to the titanium oxide layer forming step.

The acid solution is not particularly limited but may be, for example, an aqueous solution of an inorganic acid. Examples of the inorganic acid include, but not particularly limited to, a sulfuric acid, a nitric acid, a hydrochloric acid, a phosphoric acid and so on. One of them can be independently used, or two or more of them can be used in combination. The inorganic acid preferably contains one or both of a sulfuric acid and a phosphoric acid among them. In the case where the acid solution is a sulfuric acid solution and/or a phosphoric acid solution, the generation of the titanium oxide film 21 can be promoted.

Besides, the concentration of the inorganic acid in the acid solution is, but not particularly limited to, for example, 3 to 100 g/l and preferably 5 to 50 g/l.

Besides, the voltage in the anodizing only needs to be 10 V or lower as explained above, and is preferably 9 V or lower and more preferably 8 V or lower. Further, in order to form the titanium oxide film 21 in the anodizing, the voltage can be set to, for example, 1 V or higher and preferably 2 V or higher.

The time of the anodizing can be set, but not particularly limited to, for example, 30 s or more and preferably 60 s or more in order to form the titanium oxide film 21 having a required film thickness. On the other hand, if the time of the anodizing is long, a corrosion product is sometimes generated depending on the composition of titanium and the processing conditions, and therefore the time of the anodizing can be set to, for example, 600 s or less, preferably 300 s or less, and more preferably 180 s or less.

(ii) Titanium Oxide Layer Forming Step

Next, at the titanium oxide layer forming step, the anodizing is performed to form the projections 22, thereby forming the titanium oxide layer 20 having the titanium oxide film 21 and the projections 22. In the anodizing at the titanium oxide layer forming step, it is necessary to select the conditions where the spark discharge is generated on the titanium surface of the base material 10. This enables manufacture of the titanium material 1 having lower lightness and chroma than before. The reason why the lightness can be adjusted to be lower than the case of not performing the titanium oxide film forming step with a decreased voltage but performing the anodizing with an increased voltage to generate the spark discharge can be presumed to be due to the generation of the local projections 22 (particulate titanium oxides) at this step.

Further, as compared with a later-explained method according to a second embodiment, the formation of the titanium oxide film 21 in advance enables stable spark discharge. This further increases the depth of the color shade of the titanium material 1 to be obtained and causes less color unevenness at parts of the titanium material 1.

In this embodiment, an aqueous solution containing either or both of nitrate ions and nitrite ions is used, and the anodizing is performed at a voltage of higher than 10 V in the aqueous solution.

The anodizing at this step is performed at a voltage of higher than 10 V as explained above. If the voltage of the anodizing is 10 V or lower, the spark discharge does not occur, resulting in insufficient formation of asperities of the titanium oxide layer to make it difficult to reduce lightness and chroma. The above voltage only needs to be higher than 10 V, and can be set to preferably 12 V or higher and more preferably 14 V or higher. Further, at the titanium oxide layer forming step, the upper limit of the voltage is not particularly limited, but if the voltage of the anodizing is higher than 100 V, the temperature of the solution significantly increases due to Joule heat, and therefore the upper limit is preferably set to 100 V. Further, the voltage can be set to preferably 60 V or lower and more preferably 30 V or lower.

The time of the anodizing can be set, but not limited to, for example, 30 s or more and preferably 45 s or more in order to form the titanium oxide layer 20 having the fine asperities having a short wavelength. On the other hand, if the time of the anodizing is long, a corrosion product is sometimes generated depending on the composition of the base material 10 and the processing conditions, and therefore the time of the anodizing can be set to, for example, 600 s or less, preferably 300 s or less, and more preferably 180 s or less.

The total sum of either or both of nitrate ions and nitrite ions in the aqueous solution is 3 g/l or more. If the concentration of nitrate ions, nitrite ions is less than 3 g/l, the thickness of the titanium oxide layer to be formed is insufficient. Further, as a result of the insufficiency of nitrogen atoms in the system, the nitrogen concentration of the titanium oxide layer to be obtained cannot be set to the aforementioned range, and the asperities for obtaining low lightness and chroma are not sufficiently formed. The upper limit of the concentration of the nitrate ions in the aqueous solution may be, for example, the saturated concentration of nitrate. The total sum of either or both of nitrate ions and nitrite ions in the aqueous solution can be preferably set to 4 g/l or more and more preferably 5 g/l or more, and further can be preferably set to 100 g/l or less and more preferably 50 g/l or less.

The concentration of nitrate ions can be adjusted by the addition of a nitric acid aqueous solution, a nitrate or the like. Examples of representative nitrate include water-soluble nitrates, specifically, sodium nitrate, potassium nitrate, lithium nitrate, and ammonium nitrate, and one of them can be independently used or two or more of them can be used in combination. However, another metal nitrate may be used as a nitrate.

Further, a small amount of another inorganic acid may be contained in the aqueous solution. In this case, the concentration of the other inorganic acid in the aqueous solution is, for example, 2 g/l or less and preferably 1 g/l or less. Note that in the case of using the inorganic acid other than a nitric acid, such as a phosphoric acid, a sulfuric acid aqueous solution or the like as a main inorganic acid for the anodizing, fine asperities having a short wavelength are not formed on the titanium oxide layer, so that the appearance low in lightness and chroma cannot be obtained.

Through the above steps, the above-explained titanium material 1 can be manufactured. The titanium material 1 to be obtained exhibits the lower lightness and chroma than before as explained above.

2. Second Embodiment

Next, a second embodiment of the present disclosure will be explained. Hereinafter, the difference between the above-explained first embodiment and this embodiment will be mainly explained, and the explanation of the same matters will be omitted.

2.1 Titanium Material

Figure 2:
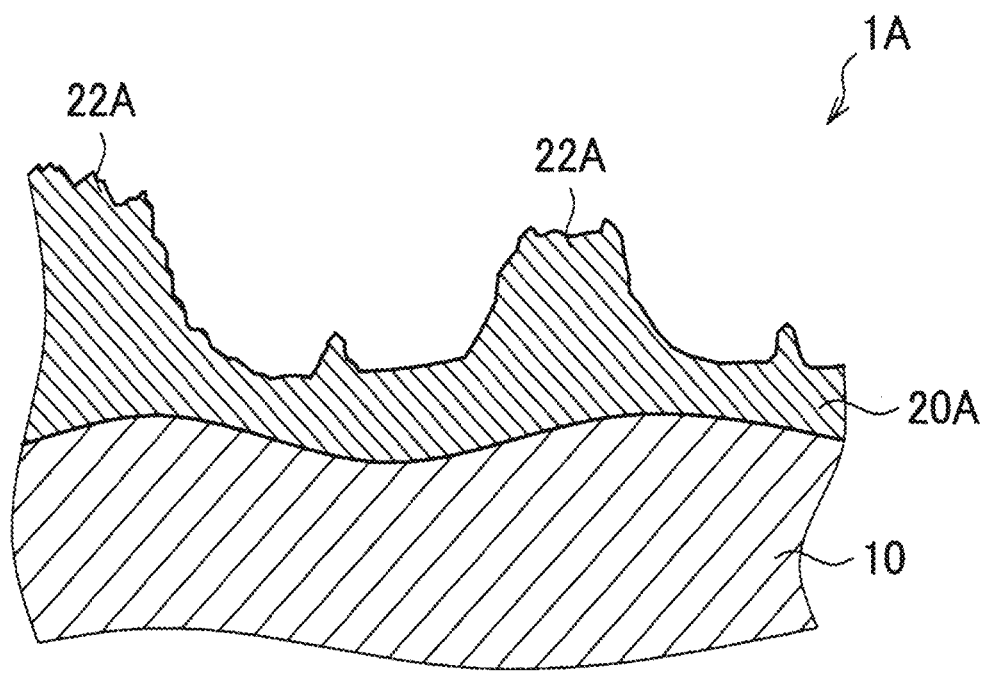
FIG. 2 is a schematic enlarged sectional view illustrating a layer configuration of a titanium material according to a second embodiment of the present disclosure.

FIG. 2 is a schematic enlarged sectional view illustrating a layer configuration of a titanium material according to the second embodiment. A titanium material 1A illustrated in FIG. 2 has a base material 10 and a titanium oxide layer 20A formed on the base material 10, and has projections 22A formed in a partial region of the titanium oxide layer 20A. In other words, the titanium oxide film 21 and the projections 22 different in titanium oxide concentration separately exist in the first embodiment, whereas they are integrally formed in this embodiment.

Also in the titanium material 1A, the thickness of the titanium oxide layer 20A whose elements are measured by GDS are 60 to 300 nm, and the titanium oxide layer 20A contains, in at %, 0.5 to 7.0 at % of nitrogen.

Further, the arithmetic mean roughness Ra of the titanium material 1A is 2.0 to 4.0 μm. Furthermore, when a profile curve obtained by the surface roughness measuring device or the like is subjected to a power spectral analysis for the titanium material 1A, the obtained profile has a peak of an amplitude height of 0.005 to 0.020 μm in a range of a wavelength of 1.1 to 2.5 μm and has a peak of an amplitude height of 0.0010 to 0.0030 μm in a range of a wavelength of 0.80 to 0.98 μm.

Thus, the titanium material 1A also has, as with the titanium material 1, a color tone expressed by L*: 30 to 40, a*: −2.0 to 9.0, b*: −7.0 to 18.0 in an L*a*b* color space, and exhibits an appearance of lower lightness and lower chroma than before.

Note that the titanium material 1A according to this embodiment is formed, for example, by performing the titanium oxide layer forming step on the base material 10 after performing the surface conditioning step while omitting the titanium oxide film forming step in the first embodiment. Accordingly, unlike the titanium material 1, the density of the titanium oxide in the titanium oxide layer 20A in the titanium material 1A is likely to be even and the interface between the projections 22A and the other part of the titanium oxide layer 20A is less likely to be formed. Further, since the titanium oxide film does not exist on the base material 10 at the titanium oxide layer forming step, the surface of the base material 10 has a conductive property and the frequency of the spark discharge becomes relatively low. Accordingly, the area ratio of the projections 22A is likely to become smaller than that in the case of the first embodiment.

Since the interface between the projections 22A and the other part of the titanium oxide layer 20A is less likely to be formed and the area ratio of the projections 22A is likely to become smaller than that in the case of the first embodiment as above, the titanium material 1A has a light-reflecting interface smaller than that of the titanium material 1 according to the first embodiment. Accordingly, comparing the titanium material 1 and the titanium material 1A, the titanium material 1 is more likely to exhibit a depth of color shade in appearance.

When viewing the titanium oxide layer 20A in a plan view from an outer surface side of the titanium material 1A, the area ratio of the projections 22A is, but not particularly limited to, for example, 10% or more, preferably 15% or more, and more preferably 20% or more. Further, the area ratio of the projections 22A is, for example, 50% or less, preferably 35% or less, and more preferably 33% or less. Note that the reason for the aforementioned preferable range of the area ratio of the projections 22A is the same as the reason in the first embodiment. Further, as an example, the titanium material according to later-explained Example 20 (Ex. 20) has the titanium oxide film omitted and has an area ratio of the projections of 13%.

2.2 Manufacturing Method of the Titanium Material

Next, an example of the manufacturing method of the above-explained titanium material 1A will be explained.

The manufacturing method of the titanium material according to this embodiment includes: a surface conditioning step of performing blast processing with alumina or SiC on the surface of the base material 10; and a titanium oxide layer forming step of thereafter performing anodizing on the surface of the base material 10 at a voltage of higher than 10 V in a solution containing either or both of nitrate ions and nitrite ions. In short, this embodiment is different from the first embodiment in that the titanium oxide film forming step is omitted and the titanium oxide layer forming step is performed directly on the surface of the base material 10 after the blast processing.

The formation of the titanium oxide layer 20A by the one-stage of anodizing as explained above makes the density of the titanium oxide in the titanium oxide layer 20A relatively uniform. Further, since the titanium oxide film does not exist on the base material 10 at the titanium oxide layer forming step, the surface of the base material 10 has a conductive property and the frequency of the spark discharge becomes relatively low. Accordingly, the amount of formation of the projections 22A in the titanium oxide layer 20A is relatively small.

The various conditions of the other steps are the same as those in the first embodiment. The titanium material 1A can be manufactured as explained above.

EXAMPLES

Hereinafter, the titanium materials and the manufacturing method of the titanium materials according to the embodiments of the present disclosure will be concretely explained while illustrating examples. Note that the examples illustrated below are merely examples of the titanium materials and the manufacturing method of the titanium materials according to the present disclosure, and the present is not limited to the following examples.

Under the conditions listed in Table 1 to Table 3, the manufacturing step of titanium being the base material, the surface conditioning step, the two-stage of anodizing, namely, the titanium oxide film forming step and the titanium oxide layer forming step were sequentially performed to manufacture titanium materials. Note that the compositions of titanium used as the base materials were as listed in Table 1. In the tables, "A" is pure titanium class 1 according to JIS H 4600, "B" is pure titanium class 2 according to JIS H 4600, "C" to "F" are titanium alloys different in composition. Further, in each of the base materials in Table 1, the balance is composed of titanium and impurities, and a numerical value of each component is on a mass basis. Further, in Tables 2, 3, the presence or absence of the treatment (alkaline degreasing, acid pickling) performed at the base material manufacturing step after the cold rolling are indicated by "yes" or "no". Further, regarding the annealing, which of the vacuum annealing or the atmospheric annealing was carried out is listed. The vacuum annealing was carried out with the degree of vacuum set to $1.0 \times 10^{-1}$ Torr or less, the temperature set to 650° C. or higher, and the treatment time set to 12 hours or more.

TABLE 1

| BASE MATERIAL | COMPOSITION (mass %) | | | | | | | | | | |
|---|---|---|---|---|---|---|---|---|---|---|---|
| (TITANIUM) | Al | V | Co | Ni | Pd | Ru | N | C | H | O | Fe |
| A (JIS CLASS 1) | — | — | — | — | — | — | 0.004 | 0.009 | 0.0024 | 0.0482 | 0.026 |
| B (JIS CLASS 2) | — | — | — | — | — | — | 0.005 | 0.012 | 0.0023 | 0.172 | 0.23 |
| C (6-4) | 5.95 | 3.97 | — | — | — | — | 0.006 | 0.014 | 0.0022 | 0.052 | 0.02 |
| D (TICOREX) | — | — | — | 0.51 | — | 0.053 | 0.004 | 0.005 | 0.001 | 0.042 | 0.03 |
| E (SMIACE) | — | — | 0.27 | — | 0.04 | — | 0.007 | 0.004 | 0.0013 | 0.031 | 0.02 |
| F (Ti—Pd) | — | — | — | — | 0.15 | — | 0.006 | 0.005 | 0.0064 | 0.085 | 0.04 |

TABLE 2

| | BASE MATERIAL | | | | | TITANIUM OXIDE FILM FORMING STEP | | | |
|---|---|---|---|---|---|---|---|---|---|
| | MANUFACTURING STEP | | SURFACE CONDITIONING STEP | | | ACID SOLUTION | | | TREAT- |
| No. | BASE MATE-RIAL | ALKALINE DE-GREASING | ANNEALING | ACID PICKL-ING | BLAST PRO-CESSING | TYPE OF BLAST | IN-ORGANIC ACID | CONCEN-TRATION (g/l) | VOLT-AGE (V) | MENT TIME (s) |
| 1 | A | YES | VACUUM ANNEALING | NO | YES | ALUMINA PARTICLE | PHOSPHORIC ACID | 10 | 5 | 30 |
| 2 | A | YES | VACUUM ANNEALING | NO | YES | SiC PARTICLE | PHOSPHORIC ACID | 5 | 4 | 60 |
| 3 | A | YES | VACUUM ANNEALING | NO | YES | ALUMINA PARTICLE | PHOSPHORIC ACID | 20 | 3 | 120 |
| 4 | A | YES | VACUUM ANNEALING | NO | YES | SiC PARTICLE | PHOSPHORIC ACID | 10 | 5 | 60 |
| 5 | A | NO | VACUUM ANNEALING | NO | YES | ALUMINA PARTICLE | SULFURIC ACID PHOSPHORIC ACID | 10 2 | 4 | 30 |
| 6 | A | YES | VACUUM ANNEALING | NO | YES | SiC PARTICLE | SULFURIC ACID | 10 | 1 | 60 |
| 7 | A | YES | VACUUM ANNEALING | NO | YES | ALUMINA PARTICLE | SULFURIC ACID | 5 | 9 | 30 |
| 8 | B | YES | VACUUM ANNEALING | NO | YES | SiC PARTICLE | SULFURIC ACID PHOSPHORIC ACID | 10 2 | 4 | 120 |
| 9 | B | YES | VACUUM ANNEALING | NO | YES | ALUMINA PARTICLE | PHOSPHORIC ACID | 5 | 5 | 30 |
| 10 | B | YES | VACUUM ANNEALING | NO | YES | SiC PARTICLE | SULFURIC ACID | 5 | 3 | 60 |
| 11 | B | YES | VACUUM ANNEALING | NO | YES | ALUMINA PARTICLE | PHOSPHORIC ACID | 20 | 5 | 60 |
| 12 | B | YES | VACUUM ANNEALING | NO | YES | SiC PARTICLE | SULFURIC ACID | 10 | 4 | 120 |
| 13 | A | YES | VACUUM ANNEALING | NO | YES | ALUMINA PARTICLE | PHOSPHORIC ACID | 10 | 4 | 30 |
| 14 | B | YES | VACUUM ANNEALING | NO | YES | SiC PARTICLE | PHOSPHORIC ACID | 30 | 10 | 30 |
| 15 | A | YES | ATMOSPHERIC ANNEALING | YES | YES | ALUMINA PARTICLE | SULFURIC ACID | 5 | 5 | 60 |
| 16 | B | YES | ATMOSPHERIC ANNEALING | YES | YES | SiC PARTICLE | PHOSPHORIC ACID | 10 | 4 | 45 |
| 17 | B | YES | VACUUM ANNEALING | NO | YES | ALUMINA PARTICLE | SULFURIC ACID | 10 | 5 | 30 |
| 18 | A | YES | VACUUM ANNEALING | NO | YES | SiC PARTICLE | PHOSPHORIC ACID | 10 | 4 | 120 |
| 19 | C | YES | VACUUM ANNEALING | NO | YES | ALUMINA PARTICLE | SULFURIC ACID | 10 | 4 | 90 |
| 20 | A | YES | VACUUM ANNEALING | NO | YES | ALUMINA PARTICLE | — | — | — | — |

TABLE 2-continued

| | | | | | | | | | | |
|---|---|---|---|---|---|---|---|---|---|---|
| 21 | D | YES | VACUUM ANNEALING | NO | YES | ALUMINA PARTICLE | SULFURIC ACID | 10 | 3 | 45 |
| 22 | E | YES | VACUUM ANNEALING | NO | YES | ALUMINA PARTICLE | SULFURIC ACID | 10 | 5 | 30 |
| 23 | F | YES | VACUUM ANNEALING | NO | YES | ALUMINA PARTICLE | SULFURIC ACID | 10 | 4 | 40 |

| | | TITANIUM OXIDE LAYER FORMING STEP | | | | | |
|---|---|---|---|---|---|---|---|
| | | | SOLUTION | | TOTAL CONCENTRATION OF NITRATE | | |
| No. | BASE MATERIAL | TYPE OF SOLUTE | CONCENTRATION (g/l) | | IONS AND NITRITE IONS (g/l) | VOLTAGE (V) | TREATMENT TIME (s) | REMARKS |
| 1 | A | AMMONIUM NITRATE | 30 | | 23.7 | 19 | 30 | EXAMPLE |
| 2 | A | AMMONIUM NITRATE | 76 | | 59.2 | 20 | 120 | EXAMPLE |
| 3 | A | AMMONIUM NITRITE | 10 | | 6.88 | 21 | 45 | EXAMPLE |
| 4 | A | AMMONIUM NITRITE | 60 | | 41.3 | 54 | 90 | EXAMPLE |
| 5 | A | AMMONIUM NITRATE | 25 | | 19.7 | 22 | 60 | EXAMPLE |
| 6 | A | AMMONIUM NITRATE / AMMONIUM NITRITE | 25 / 25 | | 36.9 | 15 | 45 | EXAMPLE |
| 7 | A | AMMONIUM NITRATE | 20 | | 15.8 | 52 | 30 | EXAMPLE |
| 8 | B | AMMONIUM NITRATE | 10 | | 7.89 | 19 | 45 | EXAMPLE |
| 9 | B | AMMONIUM NITRATE | 75 | | 59.2 | 14 | 60 | EXAMPLE |
| 10 | B | AMMONIUM NITRITE | 30 | | 20.6 | 54 | 120 | EXAMPLE |
| 11 | B | AMMONIUM NITRITE | 65 | | 44.7 | 22 | 90 | EXAMPLE |
| 12 | B | AMMONIUM NITRATE | 20 | | 31.6 | 15 | 45 | EXAMPLE |
| 13 | A | AMMONIUM NITRATE / AMMONIUM NITRITE | 20 / 20 | | 29.5 | 52 | 30 | EXAMPLE |
| 14 | B | AMMONIUM NITRATE | 30 | | 23.7 | 19 | 30 | EXAMPLE |
| 15 | A | AMMONIUM NITRATE | 10 | | 7.89 | 14 | 120 | EXAMPLE |
| 16 | B | AMMONIUM NITRATE | 50 | | 39.5 | 22 | 60 | EXAMPLE |
| 17 | B | AMMONIUM NITRATE | 20 | | 15.8 | 30 | 90 | EXAMPLE |
| 18 | A | AMMONIUM NITRATE | 50 | | 39.5 | 40 | 120 | EXAMPLE |
| 19 | C | AMMONIUM NITRATE | 20 | | 15.8 | 25 | 60 | EXAMPLE |
| 20 | A | AMMONIUM NITRATE | 30 | | 23.7 | 19 | 30 | EXAMPLE |
| 21 | D | AMMONIUM NITRATE | 50 | | 39.5 | 58 | 35 | EXAMPLE |
| 22 | E | AMMONIUM NITRATE | 100 | | 78.9 | 40 | 30 | EXAMPLE |
| 23 | F | AMMONIUM NITRATE | 20 | | 31.6 | 20 | 20 | EXAMPLE |

TABLE 3

| | BASE MATERIAL | | | | | | TITANIUM OXIDE FILM FORMING STEP | | | |
|---|---|---|---|---|---|---|---|---|---|---|
| | | MANUFACTURING STEP | | SURFACE CONDITIONING STEP | | | ACID SOLUTION | | | TREAT- |
| No. | BASE MATERIAL | ALKALINE DE-GREASING | ANNEALING | ACID PICKLING | BLAST PROCESSING | TYPE OF BLAST | INORGANIC ACID | CONCENTRATION (g/l) | VOLTAGE (V) | MENT TIME (s) |
| 101 | A | YES | VACUUM ANNEALING | NO | YES | ALUMINA PARTICLE | SULFURIC ACID | 10 | 11 | 30 |
| 102 | A | YES | VACUUM ANNEALING | NO | YES | SiC PARTICLE | PHOSPHORIC ACID | 10 | 12 | 90 |
| 103 | A | YES | VACUUM ANNEALING | NO | YES | ALUMINA PARTICLE | SULFURIC ACID | 5 | 5 | 120 |
| 104 | A | YES | VACUUM ANNEALING | NO | YES | SiC PARTICLE | PHOSPHORIC ACID | 20 | 4 | 60 |
| 105 | B | NO | VACUUM ANNEALING | NO | YES | ALUMINA PARTICLE | SULFURIC ACID PHOSPHORIC ACID | 10 2 | 5 | 45 |
| 106 | B | YES | ATMOSPHERIC ANNEALING | YES | YES | SiC PARTICLE | SULFURIC ACID | 10 | 3 | 30 |
| 107 | B | YES | VACUUM ANNEALING | NO | YES | ALUMINA PARTICLE | PHOSPHORIC ACID | 10 | 4 | 45 |
| 108 | B | YES | VACUUM ANNEALING | NO | YES | SiC PARTICLE | SULFURIC ACID | 5 | 5 | 30 |
| 109 | A | YES | VACUUM ANNEALING | NO | NO | — | SULFURIC ACID | 5 | 5 | 20 |
| 110 | A | YES | VACUUM ANNEALING | NO | YES | ALUMINA PARTICLE | SULFURIC ACID | 10 | 4 | 30 |
| 111 | A | YES | VACUUM ANNEALING | NO | YES | SiC PARTICLE | SULFURIC ACID | 5 | 7 | 30 |
| 112 | A | YES | VACUUM ANNEALING | NO | YES | ALUMINA PARTICLE | SULFURIC ACID | 10 | 3 | 30 |
| 113 | A | YES | VACUUM ANNEALING | NO | YES | ALUMINA PARTICLE | SULFURIC ACID | 10 | 4 | 30 |
| 114 | B | YES | VACUUM ANNEALING | NO | YES | SiC PARTICLE | SULFURIC ACID | 10 | 5 | 30 |
| 115 | B | YES | VACUUM ANNEALING | NO | YES | ALUMINA PARTICLE | PHOSPHORIC ACID | 10 | 13 | 30 |

| | | TITANIUM OXIDE LAYER FORMING STEP | | | | | |
|---|---|---|---|---|---|---|---|
| | | SOLUTION | | TOTAL CONCENTRATION OF NITRATE IONS AND NITRITE IONS (g/l) | | | |
| No. | BASE MATERIAL | TYPE OF SOLUTE | CONCENTRATION (g/l) | | VOLTAGE (V) | TREATMENT TIME (s) | REMARKS |
| 101 | A | AMMONIUM NITRATE | 30 | 23.7 | 19 | 30 | COMPARATIVE EXAMPLE |
| 102 | A | AMMONIUM NITRITE | 30 | 20.6 | 21 | 45 | COMPARATIVE EXAMPLE |
| 103 | A | AMMONIUM NITRATE | 0.13 | 0.1 | 21 | 90 | COMPARATIVE EXAMPLE |
| 104 | A | AMMONIUM NITRITE | 0.073 | 0.05 | 19 | 120 | COMPARATIVE EXAMPLE |
| 105 | B | SULFURIC ACID | 30 | 0 | 25 | 45 | COMPARATIVE EXAMPLE |
| 106 | B | PHOSPHORIC ACID | 30 | 0 | 21 | 90 | COMPARATIVE EXAMPLE |
| 107 | B | CITRIC ACID | 30 | 0 | 50 | 60 | COMPARATIVE EXAMPLE |
| 108 | B | AMMONIUM NITRITE | 0.015 | 0.01 | 19 | 30 | COMPARATIVE EXAMPLE |
| 109 | A | AMMONIUM NITRATE | 30 | 23.7 | 19 | 30 | COMPARATIVE EXAMPLE |
| 110 | A | AMMONIUM NITRATE | 10 | 7.89 | 9 | 60 | COMPARATIVE EXAMPLE |
| 111 | A | AMMONIUM NITRATE | 20 | 15.8 | 105 | 30 | COMPARATIVE EXAMPLE |

TABLE 3-continued

| 112 | A | AMMONIUM NITRATE | 10 | 7.89 | 7 | 30 | COMPARATIVE EXAMPLE |
| 113 | A | AMMONIUM NITRATE | 100 | 78.9 | 25 | 30 | COMPARATIVE EXAMPLE |
| 114 | B | AMMONIUM NITRATE | 10 | 7.89 | 23 | 30 | COMPARATIVE EXAMPLE |
| 115 | B | AMMONIUM NITRATE | 10 | 7.89 | 31 | 30 | COMPARATIVE EXAMPLE |

(Component Distribution, Thickness of the Titanium Oxide Layer)

The concentrations of O, N, C and Ti of each of the obtained titanium materials were measured by GDS. The thickness of the titanium oxide layer was found by the above-explained method from the O concentration.

(Surface Property)

The arithmetic mean roughness Ra of each of the obtained titanium materials was measured by the surface roughness measuring device and evaluated according to JIS B 0633. Next, the power spectral analysis of the profile curve obtained by the surface roughness measuring device was performed to obtain the wavelength where the peak existed and the height of the peak.

(Chromaticity Evaluation)

Further, a sample was collected from each of the obtained titanium materials and subjected to color measuring according to JIS Z 5600-4-5 to obtain coordinates (L*, a*, b*) in the L*a*b* color space according to JIS K 5600 4-4. L*, a*, b* are based on the L*a*b* colorimetric system defined in JIS Z 8729.

(Appearance Evaluation)

For each of the obtained titanium materials, visual evaluation of the appearance was carried out to evaluate the depth of the color shade and the color unevenness in the same sample based on the following reference.

The depth of the color shade was evaluated based on the following reference.

A: remarkable
B: slightly remarkable
C: ordinary
D: slightly insufficient
E: insufficient The color unevenness was evaluated based on the following reference.

A: none
B: slightly exist
C: exist
D: slightly conspicuous
E: conspicuous (Area Ratio of Projections)

Further, the surface on the side where the titanium oxide layer of each of the obtained titanium materials was formed was observed by the energy dispersive X-ray spectroscopy, and the concentration of oxygen atoms was measured to calculate the area ratio of the projections. Specifically, the region with high oxygen concentration in the observation region was regarded as the area ratio of the projections.

(Color-Change Test)

The color difference of titanium between before and after the test, when the sample was subjected to an immersion test for 84 days at 30° C. in a sulfuric acid aqueous solution having a pH of 4, was measured and the resistance to discoloration was evaluated. In this event, the color difference ($\Delta E$) between before and after the test was calculated using the following expression.

$$\Delta E = ((L^*_2 - L^*_1)^2 + (a^*_2 - a^*_1)^2 + (b^*_2 - b^{*1})^2)^{1/2}$$

A color difference $\Delta E$ of 5 or less was evaluated as "superior" and a color difference $\Delta E$ of more than 5 was evaluated as "inferior".

Here, $L^*_1$, $a^*_1$, $b^*_1$ are measured results of the color before the color-change test, and $L^*_2$, $a^*_2$, $b^*_2$ are measured results of the color after the color-change test.

The above results are listed in Tables 4, 5.

TABLE 4

| | TITANIUM OXIDE LAYER | | ARITH-METIC | POWER SPECTRUM OF SURFACE ROUGHNESS | | AREA RATIO OF PROJEC-TIONS (%) | AVERAGE CARBON CONCEN-TRATION IN RANGE WITHIN 500 nm FROM SURFACE OF TITANIUM OXIDE LAYER (at %) | | | | VISUAL EVALUATION | | |
|---|---|---|---|---|---|---|---|---|---|---|---|---|---|
| | | | | MAXI-MUM AMPLI-TUDE HEIGHT IN RANGE OF WAVE-LENGTH OF 1.1 TO 2.5 µm (µm) | MAXI-MUM AMPLI-TUDE HEIGHT IN RANGE OF WAVE-LENGTH OF 0.80 TO 0.98 µm (µm) | | | | | | | | |
| No. | THICK-NESS (nm) | NITRO-GEN CONCEN-TRATION (at %) | MEANS ROUGH-NESS Ra (µm) | | | | | L* | a* | b* | DEPTH OF COLOR SHADE | COLOR UN-EVEN-NESS | COLOR-CHANGE TEST RESULT |
| 1 | 89.3 | 0.8 | 2.95 | 0.005 | 0.0011 | 14 | 5.2 | 30.3 | 2.3 | −6.7 | B | A | SUPERIOR |
| 2 | 94 | 3.2 | 3.15 | 0.02 | 0.003 | 28 | 7.2 | 34.3 | 4.2 | −3.2 | A | A | SUPERIOR |
| 3 | 100.8 | 1.2 | 3.25 | 0.006 | 0.0023 | 19 | 6.5 | 32.3 | 7.2 | 0.2 | A | A | SUPERIOR |
| 4 | 265.2 | 6.5 | 3.67 | 0.014 | 0.0021 | 38 | 5.7 | 31.7 | 3.9 | −1.9 | B | B | SUPERIOR |
| 5 | 105.2 | 1.3 | 2.98 | 0.005 | 0.0029 | 27 | 15.3 | 32.5 | 2.9 | 1 | A | A | INFERIOR |

TABLE 4-continued

| | TITANIUM OXIDE LAYER | | ARITH- METIC MEANS ROUGH- NESS Ra (μm) | POWER SPECTRUM OF SURFACE ROUGHNESS | | AREA RATIO OF PROJEC- TIONS (%) | AVERAGE CARBON CONCEN- TRATION IN RANGE WITHIN 500 nm FROM SURFACE OF TITANIUM OXIDE LAYER (at %) | | | | VISUAL EVALUATION | | COLOR- CHANGE TEST RESULT |
|---|---|---|---|---|---|---|---|---|---|---|---|---|---|
| No. | THICK- NESS (nm) | NITRO- GEN CONCEN- TRATION (at %) | | MAXI- MUM AMPLI- TUDE HEIGHT IN RANGE OF WAVE- LENGTH OF 1.1 TO 2.5 μm (μm) | MAXI- MUM AMPLI- TUDE HEIGHT IN RANGE OF WAVE- LENGTH OF 0.80 TO 0.98 μm (μm) | | | L* | a* | b* | DEPTH OF COLOR SHADE | COLOR UN- EVEN- NESS | |
| 6 | 101.2 | 2.4 | 3.27 | 0.008 | 0.0012 | 41 | 3.7 | 33.4 | 3.5 | −2.3 | B | A | SUPERIOR |
| 7 | 72 | 0.8 | 3.94 | 0.008 | 0.0024 | 49 | 5.2 | 32.7 | 2.9 | −4.5 | A | A | SUPERIOR |
| 8 | 254.8 | 0.7 | 2.97 | 0.014 | 0.0028 | 23 | 6.2 | 31.7 | 3.7 | 9.8 | A | A | SUPERIOR |
| 9 | 67.2 | 1.7 | 2.87 | 0.005 | 0.001 | 18 | 5.7 | 32.3 | 4.2 | 0.7 | B | A | SUPERIOR |
| 10 | 264.6 | 2.2 | 3.22 | 0.007 | 0.003 | 36 | 6.2 | 31.7 | 2.3 | 5.1 | A | B | SUPERIOR |
| 11 | 107.8 | 0.8 | 3.17 | 0.011 | 0.0022 | 20 | 7.5 | 32.7 | 3.4 | −2.3 | B | A | SUPERIOR |
| 12 | 70.5 | 1.7 | 2.87 | 0.019 | 0.003 | 18 | 6.7 | 32.8 | 2.9 | −3.6 | B | A | SUPERIOR |
| 13 | 249.6 | 2.1 | 2.12 | 0.006 | 0.0013 | 30 | 7.4 | 36.7 | 5.2 | 3.5 | A | B | SUPERIOR |
| 14 | 87.4 | 3.2 | 2.25 | 0.009 | 0.0022 | 27 | 0.8 | 38.7 | 6.7 | 0.3 | A | A | SUPERIOR |
| 15 | 67.2 | 2.7 | 2.17 | 0.012 | 0.0021 | 17 | 2.1 | 37.5 | 2.3 | −0.5 | B | A | SUPERIOR |
| 16 | 105.6 | 0.8 | 2.22 | 0.014 | 0.0027 | 33 | 3.7 | 36.7 | 4.2 | 0.2 | A | A | SUPERIOR |
| 17 | 144 | 0.7 | 2.08 | 0.017 | 0.0011 | 32 | 5.2 | 37.8 | 4.2 | 0.6 | A | A | SUPERIOR |
| 18 | 192 | 1.1 | 2.15 | 0.019 | 0.002 | 38 | 4.6 | 38.5 | 2.3 | −2.7 | A | B | SUPERIOR |
| 19 | 110.7 | 0.7 | 2.87 | 0.006 | 0.0012 | 29 | 3.2 | 32.4 | 3.2 | −3.2 | A | A | SUPERIOR |
| 20 | 87.5 | 1.2 | 2.76 | 0.019 | 0.0029 | 13 | 2.6 | 33.5 | 3.4 | 4.2 | B | A | SUPERIOR |
| 21 | 296.4 | 0.9 | 2.87 | 0.018 | 0.0028 | 48 | 2.8 | 30.5 | 2.4 | 16.5 | B | B | SUPERIOR |
| 22 | 110.9 | 6.9 | 2.67 | 0.007 | 0.0015 | 27 | 3.2 | 31.5 | 3.2 | −2.6 | A | A | SUPERIOR |
| 23 | 113.2 | 2.3 | 2.56 | 0.006 | 0.0014 | 28 | 13.5 | 32.5 | 3.8 | −3.4 | A | A | SUPERIOR |

TABLE 5

| | TITANIUM OXIDE LAYER | | ARITH- METIC MEANS ROUGH- NESS Ra (μm) | POWER SPECTRUM OF SURFACE ROUGHNESS | | AREA RATIO OF PROJEC- TIONS (%) | AVERAGE CARBON CONCEN- TRATION IN RANGE WITHIN 500 nm FROM SURFACE OF TITANIUM OXIDE LAYER (at %) | | | | VISUAL EVALUATION | | COLOR- CHANGE TEST RESULT |
|---|---|---|---|---|---|---|---|---|---|---|---|---|---|
| No. | THICK- NESS (nm) | NITRO- GEN CONCEN- TRATION (at %) | | MAXI- MUM AMPLI- TUDE HEIGHT IN RANGE OF WAVE- LENGTH OF 1.1 TO 2.5 μm (μm) | MAXI- MUM AMPLI- TUDE HEIGHT IN RANGE OF WAVE- LENGTH OF 0.80 TO 0.98 μm (μm) | | | L* | a* | b* | DEPTH OF COLOR SHADE | COLOR UN- EVEN- NESS | |
| 101 | 91.2 | 1.5 | 2.98 | 0.002 | 0.0004 | 13 | 5.2 | 35.7 | 1.2 | 3 | D | A | SUPERIOR |
| 102 | 100.8 | 0.8 | 3.15 | 0.002 | 0.0005 | 12 | 4.3 | 28.6 | 2.9 | 2 | D | A | SUPERIOR |
| 103 | 89.3 | 0.3 | 3.12 | 0.004 | 0.002 | 5 | 6.4 | 41.5 | 3.5 | −3.5 | E | A | SUPERIOR |
| 104 | 100.8 | 0.2 | 2.02 | 0.002 | 0.0011 | 6 | 5.2 | 45.7 | 4.2 | 13.5 | E | A | SUPERIOR |
| 105 | 120 | 0.01 | 2.98 | 0.005 | 0.0005 | 2 | 15.4 | 38.7 | 1.1 | −3.2 | D | A | INFERIOR |
| 106 | 100.8 | 0.02 | 3.15 | 0.001 | 0.0012 | 2 | 0.8 | 37.8 | 3.2 | −8.2 | D | A | SUPERIOR |
| 107 | 240 | 0.03 | 3.21 | 0.001 | 0.001 | 1 | 4.2 | 37.9 | 5.4 | 19.5 | D | D | SUPERIOR |
| 108 | 91.2 | 0.02 | 2.05 | 0.005 | 0.0005 | 3 | 3.7 | 41.2 | 2.3 | −3.2 | D | A | SUPERIOR |
| 109 | 88.6 | 2.1 | 1.82 | 0.005 | 0.012 | 5 | 3.2 | 38.7 | 2.4 | 18.6 | E | A | SUPERIOR |
| 110 | 58.6 | 0.7 | 0.38 | 0.001 | 0.0003 | 3 | 5.2 | 38.4 | 2.4 | 23.4 | E | A | SUPERIOR |
| 111 | 312.2 | 0.8 | 2.35 | 0.007 | 0.001 | 53 | 7.2 | 33.4 | 2.7 | 39.5 | D | D | SUPERIOR |
| 112 | 53.7 | 0.9 | 2.42 | 0.002 | 0.0002 | 7 | 3.4 | 30.2 | 9.2 | −7.8 | D | E | SUPERIOR |
| 113 | 111.3 | 7.2 | 3.85 | 0.015 | 0.003 | 53 | 4.3 | 38.5 | 2.4 | −23.2 | E | A | INFERIOR |

TABLE 5-continued

| No. | TITANIUM OXIDE LAYER THICKNESS (nm) | NITROGEN CONCENTRATION (at %) | ARITHMETIC MEANS ROUGHNESS Ra (μm) | POWER SPECTRUM OF SURFACE ROUGHNESS | | AREA RATIO OF PROJECTIONS (%) | AVERAGE CARBON CONCENTRATION IN RANGE WITHIN 500 nm FROM SURFACE OF TITANIUM OXIDE LAYER (at %) | L* | a* | b* | VISUAL EVALUATION | | |
|---|---|---|---|---|---|---|---|---|---|---|---|---|---|
| | | | | MAXIMUM AMPLITUDE HEIGHT IN RANGE OF WAVELENGTH OF 1.1 TO 2.5 μm (μm) | MAXIMUM AMPLITUDE HEIGHT IN RANGE OF WAVELENGTH OF 0.80 TO 0.98 μm (μm) | | | | | | DEPTH OF COLOR SHADE | COLOR UNEVENNESS | COLOR-CHANGE TEST RESULT |
| 114 | 93.7 | 0.8 | 4.12 | 0.015 | 0.003 | 54 | 3.6 | 29.5 | 2.6 | −15.4 | D | A | SUPERIOR |
| 115 | 132.5 | 1.2 | 2.24 | 0.022 | 0.002 | 8 | 5.2 | 41.3 | 2.1 | −5.6 | D | A | SUPERIOR |

As listed in Table 4, the titanium materials of the present disclosure according to Exs. 1 to 23 each exhibit the appearance low in lightness and chroma. Further, as illustrated in FIG. 3, when the cross section of the titanium material according to Example 2 was observed under the scanning electron microscope, a uniform and thin titanium oxide film was formed on the base material and projections made of particulate titanium oxides were formed on the titanium oxide layer.

On the other hand, as listed in Table 5, the titanium materials of comparative examples according to Exs. 101 to 115 were not able to exhibit the appearance sufficient low in lightness or chroma. Note that in the titanium material according to Ex. 111, the anodizing voltage at the titanium oxide layer forming step was as extremely high as 105 V and, as a result of this, the thickness of the formed titanium oxide layer exceeded 300 nm, and the peeling property of the titanium oxide layer was inferior. In the titanium material according to Ex. 113, the nitric acid concentration in the solution at the titanium oxide layer forming step was high, and the nitrogen concentration in the titanium oxide layer exceeded 7.0 at % under the conditions of manufacture this time. In the titanium material according to Ex. 114, the blasting pressure of the blast processing at the surface treatment step was set large, resulting in an excessive large arithmetic mean roughness Ra.

Preferred embodiments of the present disclosure have been described above in detail, but the present disclosure is not limited to the embodiments. It should be understood that various changes and modifications are readily apparent to those skilled in the art who has the common general knowledge in the art to which the disclosure pertains, within the scope of the technical spirit as set forth in claims, and those should also be covered by the technical scope of the present disclosure.

EXPLANATION OF CODES 1, 1A titanium material
10 base material
20, 20A titanium oxide layer
21 titanium oxide film
22, 22A projection

What is claimed is:

1. A titanium material comprising:
a titanium oxide layer formed on a surface of titanium being a base material, the titanium oxide layer having a thickness measured by a glow discharge spectrometry of 60 to 300 nm, wherein:
the titanium oxide layer contains 0.5 to 7.0 at % of nitrogen, and an arithmetic mean roughness Ra of a surface thereof is 2.0 to 4.0 μm; and
a power spectrum of a surface roughness of the titanium material has a peak of an amplitude height of 0.005 to 0.020 μm in a range of a wavelength of 1.1 to 2.5 μm and has a peak of an amplitude height of 0.0010 to 0.0030 μm in a range of a wavelength of 0.80 to 0.98 μm.

2. The titanium material according to claim 1, wherein:
the titanium oxide layer has projections each existing in an island shape: and
an area ratio of the projections is 10% or more and 50% or less in a plan view of the titanium oxide layer.

3. The titanium material according to claim 1, wherein the titanium oxide layer comprises a titanium oxide film formed on the base material, and projections each formed in an island shape on a surface of the titanium oxide film.

4. The titanium material according to claim 1, wherein an L*a*b* color space is L*: 30 to 40, a*: 2.0 to 9.0, and b*: −7.0 to 18.0.

5. The titanium material according to claim 1, wherein an average carbon concentration in a range within 500 nm from the surface of the titanium oxide layer is to 14% or less in at %.

6. The titanium material according to claim 2, wherein the titanium oxide layer comprises a titanium oxide film formed on the base material, and projections each formed in an island shape on a surface of the titanium oxide film.

7. The titanium material according to claim 2, wherein an L*a*b* color space is L*: 30 to 40, a*: 2.0 to 9.0, and b*: −7.0 to 18.0.

8. The titanium material according to claim 3, wherein an L*a*b* color space is L*: 30 to 40, a*: 2.0 to 9.0, and b*: −7.0 to 18.0.

9. The titanium material according to claim 6, wherein an L*a*b* color space is L*: 30 to 40, a*: 2.0 to 9.0, and b*: −7.0 to 18.0.

10. The titanium material according to claim 2, wherein an average carbon concentration in a range within 500 nm from the surface of the titanium oxide layer is to 14% or less in at %.

11. The titanium material according to claim 3, wherein an average carbon concentration in a range within 500 nm from the surface of the titanium oxide layer is to 14% or less in at %.

12. The titanium material according to claim 4, wherein an average carbon concentration in a range within 500 nm from the surface of the titanium oxide layer is to 14% or less in at %.

13. The titanium material according to claim 6, wherein an average carbon concentration in a range within 500 nm from the surface of the titanium oxide layer is to 14% or less in at %.

14. The titanium material according to claim 7, wherein an average carbon concentration in a range within 500 nm from the surface of the titanium oxide layer is to 14% or less in at %.

15. The titanium material according to claim 8, wherein an average carbon concentration in a range within 500 nm from the surface of the titanium oxide layer is to 14% or less in at %.

16. The titanium material according to claim 9, wherein an average carbon concentration in a range within 500 nm from the surface of the titanium oxide layer is to 14% or less in at %.

* * * * *